W. C. WESTAWAY.
POWER TRANSMISSION GEARING.
APPLICATION FILED OCT. 16, 1913.
1,200,785.
Patented Oct. 10, 1916.
2 SHEETS—SHEET 1.
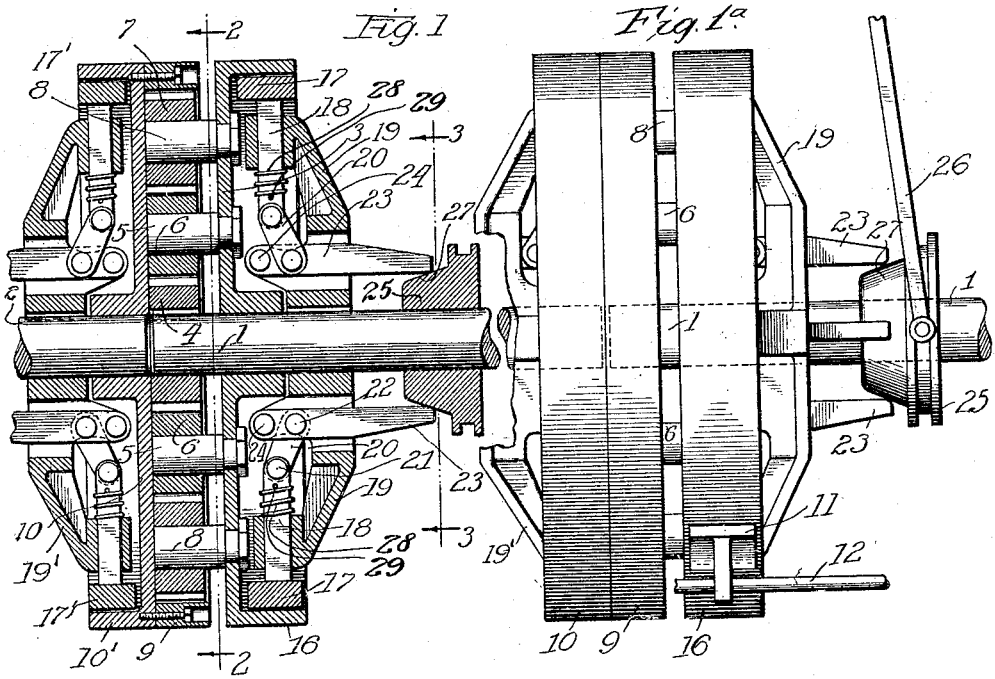
Witnesses:
Inventor
Walter C. Westaway
by Hill & Hill Attys

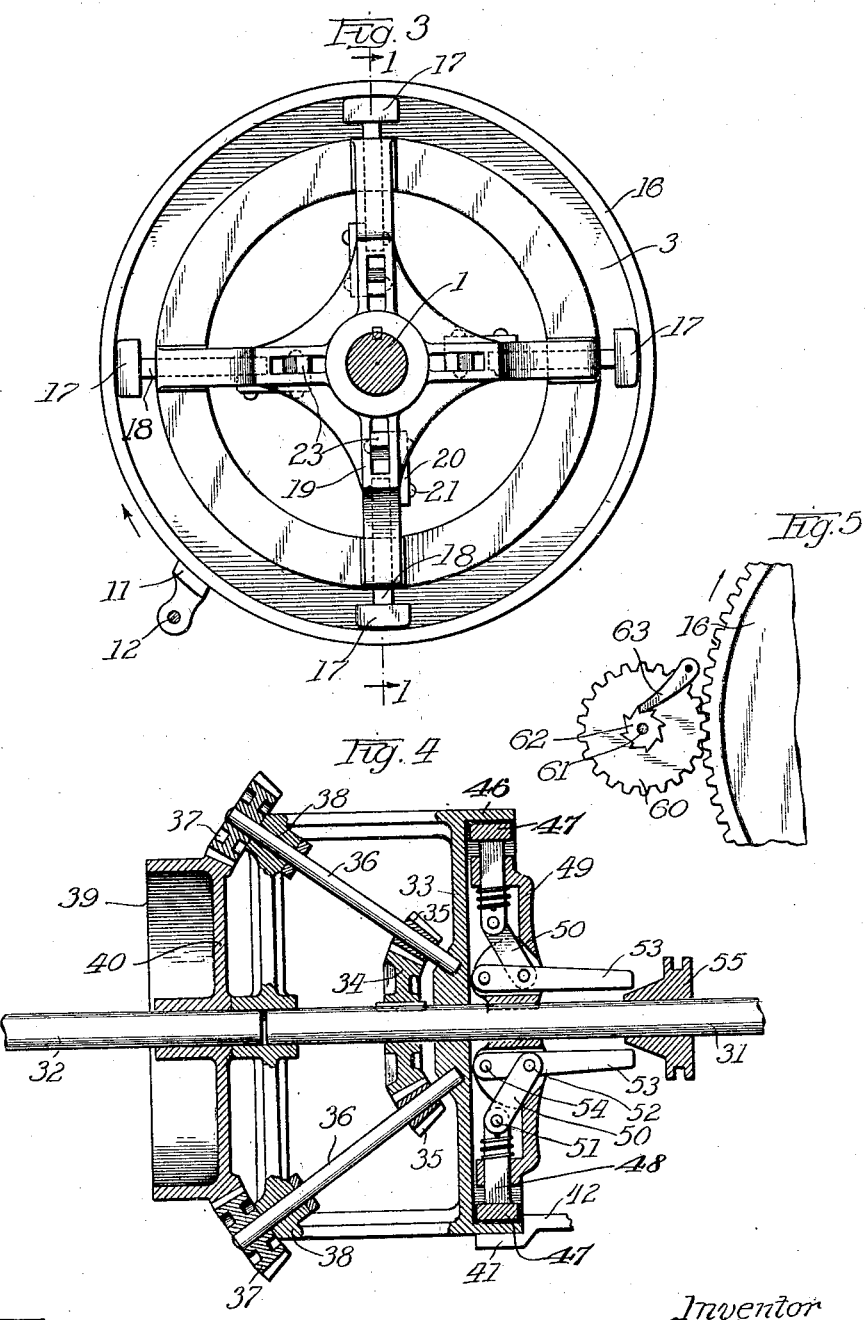

UNITED STATES PATENT OFFICE.

WALTER C. WESTAWAY, OF BELVIDERE, ILLINOIS.

POWER-TRANSMISSION GEARING.

1,200,785.   Specification of Letters Patent.   Patented Oct. 10, 1916.

Application filed October 16, 1913. Serial No. 795,424.

*To all whom it may concern:*

Be it known that I, WALTER C. WESTAWAY, a citizen of the United States, residing at Belvidere, in the county of Boone and State of Illinois, have invented certain new and useful Improvements in Power-Transmission Gearing, of which the following is a description.

My invention belongs to that general class of devices adapted for the transmission of power, and is particularly adapted for use on vehicles driven by internal combustion engines or the like. While its use is not limited on vehicles or with internal combustion engines, it is especially desirable for internal combustion engines, regardless of their use. It is usually necessary to start an internal combustion engine by means of power applied externally before the combustion which is to propel the motor begins, and as this power is usually applied by hand, any heavy load must be detached from the motor in starting, and thereafter connected to the load while the motor is running. For this purpose it is usual to use a suitable friction clutch, or the equivalent, and if the load being started consists of a considerable mass to be set in motion, it is necessary that a considerable amount of slipping take place at the clutch, or otherwise the motor will be stopped. When the load is very heavy this slipping produces much heat, and for this reason it is usual to start the load at a lower speed than that eventually desired, and this is done by means of gears or similar devices, which vary the ratio of the speed of the driving and driven parts, since if the speed of the motor be too much reduced, it will stop.

With the devices heretofore employed, it is also usually necessary to disconnect the motor from the load temporarily in making the change from one speed to another, and the result is that if there is any considerable resistance, in addition to that due to producing acceleration in the moving mass, the load may be stopped during the time of disconnection, and must be again started. This is particularly the case with heavy loaded automobile trucks on rough roads, and when, as is often the case, the load has very frequently to be stopped and started, the delays and annoyance resulting from this cause become intolerable. With my device the load is not disconnected from the motor during the change of speed, so that regardless of how long it may take to attain the higher speed, the speed attained by the low gear is not lost during the changes.

The invention has among its objects the production of a transmission device of the kind described that is simple, convenient, durable, compact, efficient, and satisfactory, and that may be used wherever found applicable.

To this end my invention consists in the novel construction, arrangement and combination of parts herein shown and described, and more particularly pointed out in the claims.

In the drawings, wherein like reference characters indicate like or corresponding parts, Figure 1 is a sectional view taken substantially on lines 1, 1 of Figs. 2 and 3. Fig. 1ª is a side elevation of a device. Fig. 2 is a sectional view taken substantially on line 2, 2 of Fig. 1. Fig. 3 is a sectional view taken substantially on line 3, 3 of Fig. 1. Fig. 4 is a sectional view of a slightly different construction, and Fig. 5 is a view in elevation of one form of locking mechanism.

Referring to the drawings, 1 represents what may be termed the driving shaft, and 2 the driven shaft. Suitably secured to the driving shaft 1, is a gear 4, and loosely mounted on the shaft 1 is a part 3, which for convenience may be termed a reaction piece. The part 3 is provided with studs or pins 5 and 8, upon which are loosely mounted gears or pinions 6 and 7, which mesh with each other, the gear 6 meshing with the gear 4 on the shaft 1. There may be any desired number of studs 5 and 8, and gears 6 and 7, and they need not necessarily be arranged exactly as shown. By arranging the studs so that they are not in alinement with the shaft 1, the size of the gears 6 and 7 may, as is obvious, be increased to a certain extent. Secured to the shaft 2 in any desired manner, preferably by suitable clutch mechanism, is a part 10, which carries an internal or ring gear 9, which meshes with the gear or gears 7.

Any suitable means may be provided for controlling or preventing the rotation of the part 3 on the shaft 1 as desired. As shown, I provide a friction pawl 11 for the purpose, suitably mounted on a shaft 12, there being any desired number of pawls and shafts. These pawls are preferably so arranged that the part 3 may rotate freely in one direction, as for example, in the direction indicated by the arrow in Fig. 3, but will be prevented from rotating in the opposite direction. Suitable means is also employed for operatively connecting the part 3 with the shaft 1 when desired. For this purpose I have shown a friction clutch, consisting of one or more parts 17 arranged to frictionally engage with the flange 16 on the part 3. The friction members 17 are provided with shanks 18, and are carried by a part 19, suitably secured to the shaft 1. Each one is connected to a lever 23 by a link 20, secured to the parts by pins or bolts 21 and 22. The lever 23 is pivotally secured at 24 to the part 19, and is arranged to coöperate with the slidable part 25 arranged on the shaft. When the part 25 is thrown toward the part 3, it tends to gradually spread the ends of the levers 23, throwing the friction members 17 into driving engagement with the flange 16. If desired, means may be provided for throwing the friction member 17 out of engagement with the flange 16 when the part 25 is moved to release the clutch. As shown, for this purpose, I have provided springs 28, each of which bears against the part 19, and a pin 29 on the shank 18. The part 25 may be shifted by a suitably formed lever, or the equivalent, 26, shown at the right of Fig. 1. In Fig. 1, I have shown two units coupled up, which permit a greater number of speed changes, it being obvious that any number of devices or units may be so coupled to connect the driving and driven shaft as may be found desirable.

As was before mentioned, the part 10 is preferably connected to the shaft part 2 by a suitable clutch mechanism. Any clutch mechanism may be employed for this purpose, as shown, I have provided mechanism similar to the clutch mechanism for engagement with the part 3, that is, friction members 17′ arranged in a frame or support 19′, suitably secured to the shaft. The part 10 is provided with a flange 10′ for engagement with the members 17′. The complete clutch mechanism is not shown for either part 10, since it is similar to the other mechanism shown in full.

The operation of the device may be described as follows: Referring particularly to Fig. 1, as well as Figs. 2 and 3, and assuming that the shaft 1 is driven by an internal combustion engine or the like, and that the friction clutch members 17 are out of operative driving engagement with the flange 16, if the shaft 1 is driven in the direction indicated, it drives the gear 4, and through the gears 6 and 7, the gear 9. The part 3 is prevented from rotating backward by the friction clutch or pawl 11, or equivalent means, the tendency of the part 3 being to move in a direction opposite to that indicated by the arrow. This part being prevented from rotation, the gear 9 is driven, and with it the driven shaft 2, to which it is suitably connected through the part 10, secured to the shaft by the clutch mechanism mentioned. Owing to the gear reductions, however, the shaft 2 is driven at a lower speed than the shaft 1, which shaft 1 may be driven at full speed, and yet start the load at low speed by means of the shaft 2. When the load has been picked up or started, the part 25 may be shifted so that the clutch members 17 operatively engage with the flange 16, and the part 19 being secured to the shaft 1, the part 3 is driven at the same speed as the shaft. The studs 5 and 8, however, are carried with the part 3, and do not rotate so that the shaft 2 is driven at the same rate of speed as the shaft 1. However, it will be noted that the gears are at all times in mesh for driving engagement, so that the load on the shaft 2 is picked up gradually during the slippage of the friction clutches. When the clutch mechanism or part 3 is released, the shaft 2 is driven, as previously set forth, through the gears 6 and 7, the part 3 remaining stationary. This clutch mechanism also forms a very convenient emergency brake, since if the shaft 2 is driven at high speed and the clutch mechanism released from engagement with the part 3, the gear being in mesh and in driving engagement, tends to drive shaft 2 at a lower speed, retarding the same. Any suitable mechanism for connecting the shaft 1 with the engine, or the shaft 2 with the load, such as clutch mechanism or reverse gears or the like, may be employed. Their uses and construction are so well known that I have considered it unnecessary to illustrate them in detail, as any suitable type of mechanism may be employed. When an additional unit, similar to that just described, is employed, either to drive the shaft 1, or to receive the power from the shaft 2, the results are obviously the same, except that the number of speeds possible are increased with the number of units added. In this case the parts 25 may be arranged to be controlled separately, so that one or all, or combinations of the clutch mechanisms, may be controlled and operated in any desired manner.

In the form of device shown in Fig. 4, the results obtained are the same, except that bevel gears are employed, and the device is not quite so compact as the preferred form illustrated in Figs. 1 to 3. Referring to Fig. 4, 31 and 32 represent the driving and driven shafts respectively. Upon one of the shafts, as shown, 31, is secured a pinion 34, which meshes with a pinion 35, which through the shaft 36, drives a pinion 37. The pinions 35 and 37 and shaft 36 are carried by the part 33, which is extended to form bearings 38. The pinions 37 mesh with the bevel gear 39 on the part 40, which may be suitably connected to the shaft 32.

Clutch mechanism consisting of the friction members 47, arranged to engage the flange 46, are shown. The clutch members 47 are arranged on the parts 48, which are connected by links 50, secured at 51 and 52 to the levers or arms 53, pivotally secured at 54 to the part 49 secured to the shaft. The members 53 are controlled by the part 55. The operation of this form is exactly the same, that is, when the clutch is released, the part 33 is prevented from moving backward by the pawl or pawls 41 on the shaft 42, and power transmitted through the gear 34 to the gears 35, shaft 36 and gear 37, to the gear 39, to shaft 32. When the clutch is thrown into operative position, the part 33 rotates with the shaft carrying the gears and driving the shaft 32 at the same speed as the shaft 31.

In Fig. 5 is shown an equivalent for the friction pawl 11, shown in the other figures. Referring to this figure, the part 3 is provided with teeth on the flange 16, which are in mesh with the gear 60, carried on shaft 61, and connected with the ratchet wheel 62. A pawl 63 is provided for engagement with the ratchet wheel 62, the arrangement of the parts being such that when the flange 16 is driven in the direction indicated by the arrow, the gear rotates with it, but the gear being prevented from rotation by the pawl 63 in the reverse direction, locks the part 3 against a rotation in a direction the reverse of that indicated by the arrow.

Having thus described my invention, it is obvious that various immaterial modifications may be made in the same without departing from the spirit of my invention; hence I do not wish to be understood as limiting myself to the exact form, construction, arrangement or combination of parts herein shown and described, or uses mentioned.

What I claim as new and desire to secure by Letters Patent is:—

1. A pair of shafts arranged end to end, a gear secured to the end of one shaft, an internal gear suitably secured to the end of the other shaft, a pair of inter-meshing gears, one of said gears in mesh with said first mentioned gear, and the other with said internal gear, a support for said pair of gears, said support loosely mounted on said first mentioned shaft, means for securing said support to said shaft as desired, and means for operatively engaging and locking said support against rotation as desired.

2. In a device of the kind described, a pair of shafts arranged end to end, a gear secured to the end of one shaft, an internal gear suitably carried on the end of the other shaft, a pair of gears, means for rotatably supporting said gears, comprising a support loosely secured to one of said shafts and provided with studs for rotatably carrying said pair of gears, said internal gear in mesh with one of the gears carried by said support, means for operatively connecting said internal gear and said support with their respective shafts, and means for locking said support against movement when the same is operatively disconnected from the shaft.

3. In a device of the kind described and in combination, a pair of shafts arranged end to end, a flanged plate arranged on each shaft, friction mechanism for operatively connecting said plates to the shafts as desired, an internal gear carried by one plate, a plurality of inter-meshing gears carried by the other plate, and arranged with one in mesh with said internal gear, a gear secured to the other shaft and in mesh with one of the gears carried by the plate arranged thereon, and means for engaging the plate carrying said plurality of gears, and locking the same against movement when the plate is disconnected from its respective shaft.

In testimony whereof, I have hereunto signed my name in the presence of two subscribing witnesses.

WALTER C. WESTAWAY.

Witnesses:
   Roy W. Hill,
   Charles I. Cobb.

Copies of this patent may be obtained for five cents each, by addressing the "Commissioner of Patents, Washington, D. C."